US012727603B2

(12) United States Patent
Kamiya et al.

(10) Patent No.: US 12,727,603 B2
(45) Date of Patent: Sep. 8, 2026

(54) SOLID MILK WITH HARDENED OUTER SURFACE

(71) Applicant: MEIJI CO., LTD., Tokyo (JP)

(72) Inventors: Tetsu Kamiya, Tokyo (JP); Keigo Hanyu, Tokyo (JP); Aya Kato, Tokyo (JP); Koji Yamamura, Tokyo (JP)

(73) Assignee: MEIJI CO., LTD., Tokyo (JP)

(*) Notice: Subject to any disclaimer, the term of this patent is extended or adjusted under 35 U.S.C. 154(b) by 648 days.

(21) Appl. No.: 18/018,665

(22) PCT Filed: Mar. 12, 2021

(86) PCT No.: PCT/JP2021/009953
§ 371 (c)(1),
(2) Date: Jan. 30, 2023

(87) PCT Pub. No.: WO2022/024441
PCT Pub. Date: Feb. 3, 2022

(65) Prior Publication Data

US 2023/0354837 A1 Nov. 9, 2023

(30) Foreign Application Priority Data

Jul. 31, 2020 (JP) ................................ 2020-131178

(51) Int. Cl.
*A23C 9/18* (2006.01)

(52) U.S. Cl.
CPC .................................... *A23C 9/18* (2013.01)

(58) Field of Classification Search
CPC .................................. A23P 10/28; A23C 9/18
See application file for complete search history.

(56) References Cited

U.S. PATENT DOCUMENTS 8,828,471 B2 9/2014 Shibata et al.
2009/0175998 A1* 7/2009 Shibata .................. A23P 10/28 426/455
2013/0078357 A1 3/2013 Shibata et al.
2014/0017367 A1 1/2014 Rastello-De Boisseson et al.
(Continued)

FOREIGN PATENT DOCUMENTS

EP 3 791 727 3/2021
EP 3 861 861 8/2021
(Continued)

OTHER PUBLICATIONS

Extended European Search Report issued Jul. 23, 2024 in corresponding European Patent Application No. 20850451.2.
(Continued)

*Primary Examiner* — Michele L Jacobson
(74) *Attorney, Agent, or Firm* — Wenderoth, Lind & Ponack, L.L.P.

(57) ABSTRACT

Provided are a solid food and a solid milk which have suitable solubility and strength adequate to resist breakage during handling. The solid food is a solid food having a solid form obtained by compression molding a food powder, in which an increase Ya (% by weight) in total crystallization rate that is a difference of a crystal ratio with respect to a total weight at a depth Xa (mm) from a surface of the solid food relative to a crystal ratio in an inner part of the solid food satisfies the following Formula (1A), $$Ya<-5.24Xa+6.65 \quad (1A)$$

2 Claims, 3 Drawing Sheets

(56) References Cited

U.S. PATENT DOCUMENTS

| | | | |
|---|---|---|---|
| 2017/0251686 | A1 | 9/2017 | Chaurin et al. |
| 2022/0322688 | A1 | 10/2022 | Kato et al. |
| 2022/0346431 | A1 | 11/2022 | Hanyu et al. |

FOREIGN PATENT DOCUMENTS

| | | |
|---|---|---|
| JP | 2007-307592 | 11/2007 |
| JP | 2008-290145 | 12/2008 |
| JP | 2009-521906 | 6/2009 |
| JP | 2012-513740 | 6/2012 |
| JP | 2012-513741 | 6/2012 |
| JP | 5350799 | 11/2013 |
| JP | 5688020 | 3/2015 |
| JP | 2017-134085 | 8/2017 |
| TW | 201201702 | 1/2012 |

OTHER PUBLICATIONS

International Search Report (ISR) issued May 25, 2021 in International (PCT) Application No. PCT/JP2021/009953.

Mitsuho Shibata, "Development of Production Technology for Compressed Powdered Formula", Pharm Tech Japan, vol. 33, No. 8, pp. 173-177, 2017, cited in the ISR.

R. W. Bell et al., "Foam Spray Drying Methods of Making Readily Dispersible Nonfat Dry Milk", Journal of Dairy Science, vol. 46, Issue 12, pp. 1352-1356, Dec. 1963, cited in the specification.

"Determination of Free Fat on the Surface of Milk Powder Particles", Analytical Method for Dry Milk Products, A/S NIRO Atomizer, 1978, cited in the specification.

Mitsuho Shibata et al., "Investigation of measuring free fat in powdered milk", Nippon Shokuhin Kagaku Kogaku Kaishi, vol. 53, No. 10, pp. 551-554, 2006, cited in the specification.

Office action issued Jul. 16, 2026 in Indonesian Application No. P00202300847, with English translation.

Mitsuho Shibata et al., "Effect of the Crystallinity of Baby Milk Powder on the Surface Structure and Stickiness of Solid. Milk", Pharmaceutics, 2013, vol. 73, No. 2, pp. 136-141, English summary.

Fujimoto Hiroshi et al., "The Development of the Manufacturing Technology Related Compressed Powdered Formula", IPEJ Journal, vol. 22, No. 3, pp. 16-19, English abstract.

* cited by examiner

FIG. 1
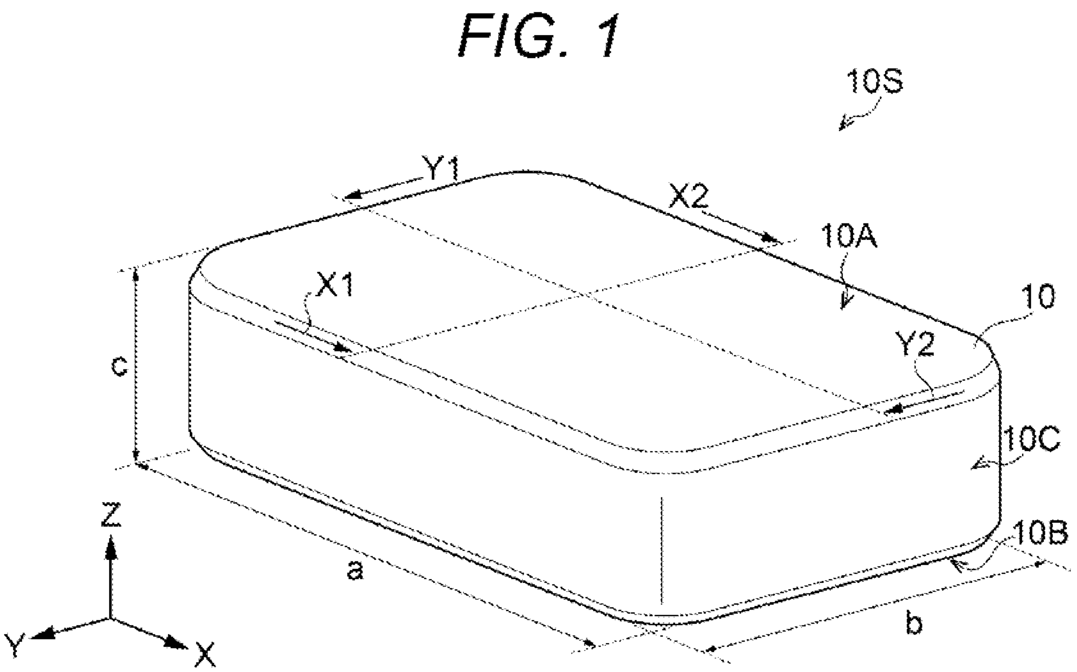
FIG. 2
10A
10
10C
X1
X2
10B
FIG. 3
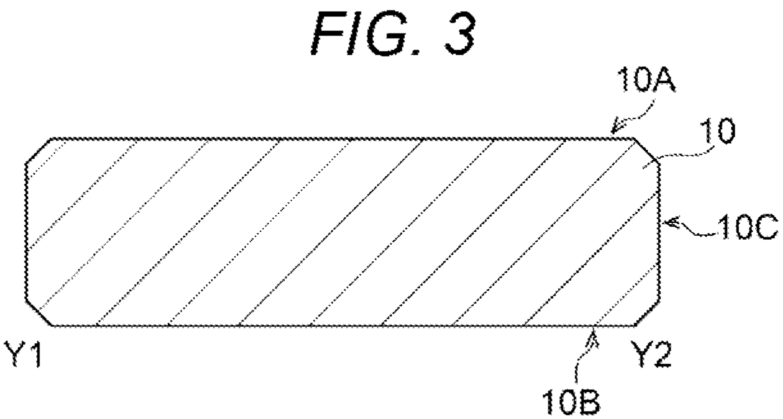

SOLID MILK WITH HARDENED OUTER SURFACE

TECHNICAL FIELD

The present invention relates to a solid food and a solid milk.

BACKGROUND ART

As a solid food, a solid milk obtained by compression molding a powdered milk is known (see PTL 1 and PTL 2). This solid milk is required to have such solubility that it quickly dissolves when placed in warm water. At the same time, transportation suitability, that is, resistance to breakage that prevents breakage such as cracking or collapse from occurring during transportation or carrying, is also required.

As a tablet press for compression molding a food powder including a powdered milk, a tablet press in which a slide plate having two die hole positions is horizontally reciprocated (see PTL 3) is known.

CITATION LIST

Patent Literature

PTL 1: Japanese Patent No. 5,350,799
PTL 2: Japanese Patent No. 5,688,020
PTL 3: JP-A-2007-307592

SUMMARY OF THE INVENTION

Technical Problem

It is desired that a food powder or a powdered milk is compression molded to produce a solid food and a solid milk which have strength adequate to resist breakage during handling and improved solubility.

An object of the present invention is to provide a solid food and a solid milk which have suitable solubility and strength adequate to resist breakage during handling.

Solution to Problem

A solid food of the present invention is a solid food having a solid form obtained by compression molding a food powder, in which an increase Ya (% by weight) in total crystallization rate that is a difference of a crystal ratio with respect to a total weight at a depth Xa (mm) from a surface of the solid food relative to a crystal ratio in an inner part of the solid food satisfies the following Formula (1A), $$Ya < -5.24Xa + 6.65 \quad (1A).$$

A solid milk of the present invention is a solid milk having a solid form obtained by compression molding a powdered milk, in which an increase Yb (% by weight) in total crystallization rate that is a difference of a crystal ratio with respect to a total weight at a depth Xb (mm) from a surface of the solid milk relative to a crystal ratio in an inner part of the solid milk satisfies the following Formula (1), $$Yb < -5.24Xb + 6.65 \quad (1).$$

Advantageous Effects of the Invention

According to the present invention, the solid food having the solid form obtained by compression molding the food powder is configured such that an increase Ya (% by weight) in total crystallization rate that is a difference of a crystal ratio with respect to a total weight at a depth Xa (mm) from a surface of the solid food relative to a crystal ratio in an inner part of the solid food satisfies the following Formula (1A). The solid food in which the increase Ya (% by weight) in total crystallization rate satisfies Formula (1A) can be produced by performing a hardening treatment including a humidification treatment on a compression molded body of a food powder obtained by compression molding the food powder at a temperature of higher than 100° C. and 330° C. or lower, and suitable solubility can be realized by securing strength adequate to resist breakage during handling.

$$Ya < -5.24Xa + 6.65 \quad (1A)$$

In addition, according to the present invention, the solid milk having the solid form obtained by compression molding the powdered milk is configured such that an increase Yb (% by weight) in total crystallization rate that is a difference of a crystal ratio with respect to a total weight at a depth Xb (mm) from a surface of the solid milk relative to a crystal ratio in an inner part of the solid milk satisfies the following Formula (1). The solid milk in which the increase Yb (% by weight) in total crystallization rate satisfies Formula (1) can be produced by performing a hardening treatment including a humidification treatment on a compression molded body of a powdered milk obtained by compression molding the powdered milk at a temperature of higher than 100° C. and 330° C. or lower, and suitable solubility can be realized by securing strength adequate to resist breakage during handling.

$$Yb < -5.24Xb + 6.65 \quad (1)$$

BRIEF DESCRIPTION OF DRAWINGS

FIG. 1 is a perspective view of a solid milk according to a first embodiment.

FIG. 2 is a cross-sectional view taken along X1-X2 of the solid milk of FIG. 1.

FIG. 3 is a cross-sectional view taken along Y1-Y2 of the solid milk of FIG. 1.

DESCRIPTION OF EMBODIMENTS

Figure 4:
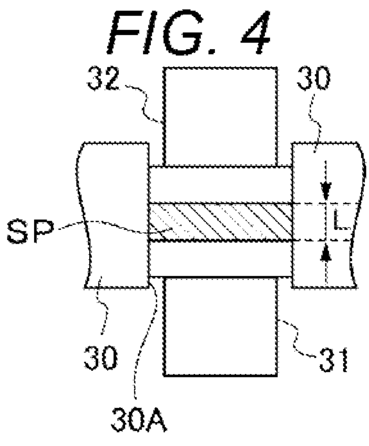
FIG. 4 is an explanatory view describing positions of a slide plate, an upper punch, and a lower punch of a tablet press.

Hereinafter, embodiments of the present invention will be described. However, the embodiment to be described below is merely an example and can be appropriately modified within an apparent range for those skilled in the art.

First Embodiment (Configuration of Solid Milk 10S)

FIG. 1 is a perspective view of a solid milk 10S according to the present embodiment. FIG. 2 is a cross-sectional view taken along line X1-X2 of the solid milk 10S of FIG. 1. FIG. 3 is a cross-sectional view taken along line Y1-Y2 of the solid milk 10S of FIG. 1.

The solid milk 10S has a body 10 having a solid form obtained by compression molding a powdered milk. The body 10 has a first face 10A that is flat and parallel to an XY plane and a second face 10B that is flat and parallel to the XY plane. The first face 10A and the second face 10B are faces facing each other back to back. The shape of the body 10 is determined depending on the shape of a mold (a die of a tablet press) used in compression molding, but is not particularly limited as long as it is a shape having a certain degree of dimension (size, thickness, angle). The schematic shape of the body 10 is a round column shape, an elliptical column shape, a cubic shape, a rectangular parallelepiped shape, a plate shape, a polygonal column shape, a polygonal pyramid shape, a polyhedron shape, or the like. From the viewpoint of simplicity of molding, convenience of transportation, or the like, a round column shape, an elliptical column shape, and a rectangular parallelepiped shape are preferred. The schematic shape of the body 10 of the solid milk 10S illustrated in each of FIGS. 1 to 3 is a rectangular parallelepiped shape having a dimension of a×b×c (see FIG. 1) and the body 10 has a lateral face 10C parallel to the XZ plane or the YZ plane. Each of a corner part configured by the first face 10A and the lateral face 10C and a corner part configured by the second face 10B and the lateral face 10C is chamfered to have a tapered shape. In the case of the corner part being chamfered, the situation of the solid milk 10S being fractured when being transported, etc. can be suppressed.

A surface is a face that forms the outside of a material. A surface layer is a layer near the surface (vicinity of the surface) including the surface. For example, the surface layer is a layer formed by compression molding a powdered milk and further hardening through the hardening treatment. The surface layer of the present embodiment is a harder layer than the inner part. Herein, a state in which the surface layer is a harder layer than the inner part indicates that a power necessary for peeling off a thin layer is larger in the surface than in the inner part.

The solid milk 10S of the present embodiment is a solid milk having a solid form obtained by compression molding and hardening a powdered milk. Here, an increase Yb (% by weight) in total crystallization rate that is a difference of a crystal ratio with respect to a total weight at a depth Xb (mm) from a surface of the solid milk 10S relative to a crystal ratio in an inner part of the solid milk satisfies the following Formula (1).

$$Yb<-5.24Xb+6.65 \quad (1)$$

The total crystallization rate is a crystal ratio (% by weight) with respect to the total weight. The increase in total crystallization rate is defined as a difference obtained by subtracting a crystallization rate of crystals present before the hardening treatment from a crystallization rate of the sum of the crystals present before the hardening treatment and crystals increased according to a magnitude of the influence of humidification received in the hardening treatment. The crystallization rate of the crystals present before the hardening treatment corresponds to a crystallization rate of crystals in the inner part of the solid milk having no or substantially no influence of humidification in the present embodiment in the hardening treatment. That is, the increase in total crystallization rate is a difference of the crystal ratio with respect to the total weight in each depth from the surface of the solid milk relative to the crystal ratio in the inner part of the solid milk. Examples of the crystal include α-lactose crystals and β-lactose crystals.

The inner part of the solid milk refers to a region in which the total crystallization rate does not vary or does not substantially vary before and after the hardening treatment, and for example, is a central portion of the solid milk or a portion in the vicinity of the center of the solid milk. Specifically, the inner part of the solid milk is in a cubic range of ±1 mm from the center of the solid milk in an XYZ direction or a spherical range having a radius of 1 mm from the center of the solid milk. The hardening treatment will be described in detail, and is a treatment performed for hardening a compression molded body of a powdered milk when producing a solid milk.

In the above description, the inner part of the solid milk refers to a region in which the total crystallization rate does not vary or does not substantially vary before and after the hardening treatment, and for example, the central portion of the solid milk or the portion in the vicinity of the center of the solid milk will be described, but the inner part of the solid milk may be simply a central portion of the solid milk or the portion in the vicinity of the center of the solid milk regardless of whether or not the total crystallization rate varies before and after the hardening treatment.

In the solid milk 10S of the present embodiment, it is preferable that the increase Yb (% by weight) in total crystallization rate at the depth Xb (mm) from the surface of the solid milk satisfies the following Formula (1-1).

$$Yb<-5.24Xb+6.15 \quad (1\text{-}1)$$

It is more preferable that the increase Yb (% by weight) in total crystallization rate satisfies the following Formula (1-2).

$$Yb<-5.24Xb+5.65 \quad (1\text{-}2)$$

In the solid milk 10S of the present embodiment, it is preferable that the increase Yb (% by weight) in total crystallization rate at the depth Xb (mm) from the surface of the solid milk satisfies the following Formula (2).

$$Yb\leq 6.34Xb^2-11.15Xb+5.05 \quad (2)$$

It is more preferable that the increase Yb (% by weight) in total crystallization rate satisfies the following Formula (2-1).

$$Yb\leq 4.89Xb^2-8.39Xb+3.51 \quad (2\text{-}1)$$

It is still more preferable that the increase Yb (% by weight) in total crystallization rate satisfies the following Formula (2-2).

$$Yb\leq 6.40Xb^2-7.59Xb+2.28 \quad (2\text{-}2)$$

The increase in total crystallization rate can be determined as a total crystallization rate of the entire surface by cutting the surface by a thickness of 0.1 mm for each XRD measurement of the measurement surface of the sample by, for example, an X-ray diffraction (XRD) method. In addition, the increase in total crystallization rate can be measured with accuracy of, for example, about 0.05 mm to 0.1 mm in a depth direction of the sample with an XRD measuring apparatus performing two-dimensional mapping.

One or two or more holes penetrating the body 10 from the first face 10A to reach to the second face 10B may be provided in the body 10. The shape of the hole is an oval shape, a rounded rectangle shape, an elliptical shape, a round shape, a rectangular shape, a square shape, or other polygonal shapes, for example, in a cross-section parallel to the XY plane. The position of the hole is preferably a position without significant unevenness when viewed from the central position of the first face 10A, and for example, the position is an arrangement that is point-symmetric with respect to the central position of the first face 10A or an arrangement that is line-symmetric with respect to a line parallel to an X axis passing through the center of the first face 10A or a line parallel to a Y axis. In the case of providing one hole, the hole is provided, for example, at the center of the first face 10A. In the case of providing a hole, the edge of the hole may be a tapered inclined face. Incidentally, in the case of providing a hole, the inner surface of the hole is a surface harder than the inner part similarly to the first face 10A.

The components of the solid milk 10S are basically the same as components of the powdered milk as a raw material. The components of the solid milk 10S are, for example, fats, proteins, sugars, minerals, vitamins, moisture, and the like.

The powdered milk is produced from a liquid type milk (liquid milk) containing milk components (for example, components of a cow milk). The milk components are, for example, a raw milk (whole milk), a skimmed milk, cream, and the like. The moisture content ratio of the liquid milk is, for example, 40% by weight to 95% by weight. The moisture content ratio of the powdered milk is, for example, 1% by weight to 5% by weight. Nutritional components to be described below may be added to the powdered milk. The powdered milk may be a whole powdered milk, a powdered skimmed milk, or a creamy powder as long as it is suitable for producing the solid milk 10S. It is preferable that the content ratio of fat in the powdered milk is, for example, 5% by weight to 70% by weight.

The milk components which are used as a raw material for the powdered milk are, for example, derived from a raw milk. Specifically, the milk components are derived from a raw milk of cows (Holstein cows, Jersey cows, and the like), goats, sheep, buffalos, and the like. Fat components are contained in the raw milk, but a milk in which a part or the whole of the fat components are removed by centrifugal separation or the like to adjust the content ratio of fat may be used.

Further, the milk components which may be used as raw materials for the powdered milk are, for example, vegetable milk derived from a plant. Specific examples thereof include those derived from plants such as soybean milk, rice milk, coconut milk, almond milk, hemp milk, and peanut milk. Fat components are contained in the vegetable milk, but a milk in which a part or the whole of the fat components are removed by centrifugal separation or the like to adjust the content ratio of fat may be used.

The nutritional components which are used as a raw material for the powdered milk are, for example, fats, proteins, sugars, minerals, vitamins, and the like. One kind or two or more kinds of these may be added.

Proteins which may be used as a raw material for the powdered milk are, for example, milk proteins and milk protein fractions, animal proteins, vegetable proteins, peptides and amino acids of various chain length obtained by decomposing those proteins with enzymes etc., and the like. One kind or two or more kinds of these may be added. Milk proteins are, for example, casein, whey proteins (α-lactoalbumin, β-lactoglobulin, and the like), whey protein concentrate (WPC), whey protein isolate (WPI), and the like. Animal proteins are, for example, egg protein. Vegetable proteins are, for example, soybean protein and wheat protein. Examples of the amino acids include taurine, cystine, cysteine, arginine, and glutamine.

Fats (oils and fats) which may be used as a raw material for the powdered milk are animal oils and fats, vegetable oils and fats, fractionated oils, hydrogenated oils, and transesterified oils thereof. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

Sugars which may be used as a raw material for the powdered milk are, for example, oligosaccharides, monosaccharides, polysaccharides, artificial sweeteners, and the like. One kind or two or more kinds of these may be added. Oligosaccharides are, for example, milk sugar, cane sugar, malt sugar, galacto-oligosaccharides, fructo-oligosaccharides, lactulose, and the like. Monosaccharides are, for example, grape sugar, fruit sugar, galactose, and the like. Polysaccharides are, for example, starch, soluble polysaccharides, dextrin, and the like. Incidentally, instead of or in addition to artificial sweeteners of sugars, non-sugar artificial sweeteners may be used.

Minerals which may be used as a raw material for the powdered milk are, for example, sodium, potassium, calcium, magnesium, iron, copper, zinc, and the like. One kind or two or more kinds of these may be added. Incidentally, instead of or in addition to sodium, potassium, calcium, magnesium, iron, copper, and zinc of minerals, either or both of phosphorus and chlorine may be used.

In the solid milk 10S, a large number of pores (for example, fine pores) generated when a powdered milk as a raw material for the solid milk 10S is compression molded exist. These plurality of pores are dispersed (distributed) corresponding to the packing fraction profile in the depth direction of the solid milk 10S. As the pore is larger (wider), a solvent such as water is easy to penetrate, so that the solid milk 10S can be rapidly dissolved. On the other hand, when the pore is too large, the hardness of the solid milk 10S may be reduced or the surface of the solid milk 10S may become coarse. The dimension (size) of each pore is, for example, 10 μm to 500 μm.

The solid milk 10S is required to have a certain degree of solubility to a solvent such as water. The solubility can be evaluated, for example, by a time for the solid milk 10S to completely dissolve or the amount of non-dissolved residues at a predetermined time when the solid milk 10S as a solute and water as a solvent are prepared to have a predetermined concentration.

It is preferable that the solid milk 10S has a predetermined range of hardness. The hardness can be measured by a known method. In the present specification, the hardness is measured by using a load cell tablet hardness tester. The solid milk 10S having a rectangular parallelepiped shape is placed on the load cell tablet hardness tester while the second face 10B of the solid milk 10S is set to a bottom face, is fixed by using one face parallel to the XZ plane and one face parallel to the YZ plane of the lateral face 10C, and is pushed by a fracture terminal of the hardness tester at a constant speed from another face side, which is not fixed and is parallel to the XZ plane, of the lateral face 10C in a minor axis direction of the first face 10A (Y-axis direction in FIG. 1) toward a direction in which the YZ plane is a fracture face, and a loading [N] when fracturing the solid milk 10S is regarded as a hardness (tablet hardness) [N] of the solid milk 10S. In the case of the solid milk 10S, the measurement point is selected from a point at which distances between the first face 10A and the second face 10B on the line segment intersecting a plane parallel to the YZ plane, in which distances between a pair of the YZ planes of the lateral face

10C are equal, with the XZ plane of the lateral face 10C, are equal. For example, a load cell tablet hardness tester (PORTABLE CHECKER PC-30) manufactured by OKADA SEIKO CO., LTD. is used. The fracture terminal built in the hardness tester has a contact face being in contact with the solid milk 10S. The contact face of the fracture terminal is a rectangle of 1 mm×24 mm and is disposed in a direction in which the long axis of the rectangle is parallel to the Z axis. The contact face of the fracture terminal is configured to push a measurement point of the solid milk 10S in at least a part thereof. The speed of the fracture terminal pushing the solid milk 10S is set to 0.5 mm/s. The measurement of the hardness is not limited to the solid milk 10S and can also be applied to the case of measuring the hardness of a compression molded body of the powdered milk (unhardened solid milk 10S) described below. Regarding the hardness measured as described above, in order to avoid the situation of the solid milk 10S being fractured when the solid milk 10S is transported, etc. as much as possible, the hardness of the solid milk 10S is preferably 20 N or more and more preferably 40 N or more. On the other hand, since the solubility of the solid milk 10S deteriorates when the hardness of the solid milk 10S is too high, the hardness of the solid milk 10S is preferably 100 N or less and more preferably 70 N or less.

The hardness used herein is a physical quantity of power having a unit of [N (newton)]. The hardness increases as a fractured area of a solid milk sample becomes larger. Herein, the term "fracture" indicates that, when a vertical loading is statically applied to a sample such as the solid milk 10S, the sample is fractured, and a cross-sectional area generated when the sample is fractured is referred to as a "fractured area". That is, the hardness [N] is a physical quantity dependent on the dimension of the solid milk sample. There is mentioned a fracture stress [N/m$^2$] as a physical quantity not dependent on the dimension of the solid milk sample. The fracture stress is a power applied per unit fractured area at the time of the sample being fractured, is not dependent on the dimension of the solid milk sample, and is an index with which mechanical actions applied to solid milk samples can be compared even between solid milk samples having different dimensions. Fracture stress=Hardness/Fractured area is established. The description has been simply given using the hardness [N] in this specification, but the hardness may be represented as the fracture stress [N/m$^2$] obtained by dividing the hardness by the fractured area. When the fracture stress is calculated, a fractured face is assumed, and the fracture stress is calculated using the minimum fractured area in the assumed fractured face. For example, in the case of the solid milk 10S, an ideal fractured area is represented by a dimension b×c that is a fractured area in the face including a line passing through the center of the solid milk and parallel to the Z axis. For example, in a case where the dimension of the schematic shape of the solid milk 10S is a rectangular parallelepiped shape of 31 mm (a)×24 mm (b)×12.5 mm (c), an ideal fractured area is 300 mm$^2$ (24 mm (b)×12.5 mm (c)). The preferred hardness range of the solid milk 10S that is 20 N or more and 100 N or less corresponds to a preferred fracture stress range that is 0.067 N/mm$^2$ or more and 0.33 N/mm$^2$ or less obtained by dividing the hardness by the fractured area (300 mm$^2$). For example, a preferred range of the fracture stress of the solid milk 10S is 0.067 N/mm$^2$ or more and 0.739 N/mm$^2$ or less, considering the range of the fractured area.

(Method for Producing Solid Milk 10S)

Next, the method for producing the solid milk 10S will be described. First, a powdered milk which is used as a raw material for the solid milk 10S is produced. In a process of producing a powdered milk, a powdered milk is produced, for example, by a liquid milk preparation step, a liquid milk clarification step, a sterilization step, a homogenization step, a condensation step, a gas dispersion step, and a spray drying step.

The liquid milk preparation step is a step of preparing a liquid milk of the above-described components.

The clarification step is a step for removing fine foreign matters contained in the liquid milk. In order to remove these foreign matters, for example, a centrifuge, a filter, and the like may be used.

The sterilization step is a step for killing microorganisms such as bacteria contained in water, milk components, or the like of the liquid milk. Since microorganisms, which are considered to be actually contained, are changed depending on the type of the liquid milk, sterilization conditions (a sterilization temperature and a retention time) are appropriately set according to the microorganisms.

The homogenization step is a step for homogenizing the liquid milk. Specifically, the particle diameter of solid components such as fat globules contained in the liquid milk is decreased, and these components are uniformly dispersed into the liquid milk. In order to decrease the particle diameter of solid components of the liquid milk, for example, the liquid milk may be caused to pass through a narrow gap while being pressurized.

The condensation step is a step for condensing the liquid milk before the spray drying step to be described below. In condensation of the liquid milk, for example, a vacuum evaporator or an evaporator may be used. Condensation conditions are appropriately set within a range that components of the liquid milk are not excessively altered. According to this, a condensed milk can be obtained from the liquid milk. Subsequently, in the present invention, it is preferable that a gas is dispersed into the condensed liquid milk (condensed milk) and then spray drying is performed. In this case, the moisture content ratio of the condensed milk is, for example, 35% by weight to 60% by weight, and is preferably 40% by weight to 60% by weight and more preferably 40% by weight to 55% by weight. When such a condensed milk is used and a gas is dispersed, decreasing the density of the condensed milk makes the condensed milk bulky, and the condensed milk in a bulky state in this way is sprayed and dried, so that a powdered milk having preferable characteristics when a solid milk is produced can be obtained. Incidentally, in a case where the moisture of the liquid milk is small or the treated amount of the liquid milk to be subjected to the spray drying step is small, this step may be omitted.

The gas dispersion step is a step for dispersing a predetermined gas into the liquid milk. In this case, the predetermined gas the volume of which is, for example, $1\times10^{-2}$ times or more and 7 times or less the volume of the liquid milk is dispersed, and the volume thereof is preferably $1\times10^{-2}$ times or more and 5 times or less the volume of the liquid milk, more preferably $1\times10^{-2}$ times or more and 4 times or less the volume of the liquid milk, and most preferably $1\times10^{-2}$ times or more and 3 times or less.

The predetermined gas is preferably pressured in order to disperse the predetermined gas into the liquid milk. The pressure for pressurizing the predetermined gas is not particularly limited as long as it is within a range enabling the gas to effectively disperse into the liquid milk, but the atmospheric pressure of the predetermined gas is, for example, 1.5 atm or more and 10 atm or less and preferably 2 atm or more and 5 atm or less. Since the liquid milk is sprayed in the following spray drying step, the liquid milk flows along a predetermined flow passage, and in this gas dispersion step, by running the predetermined gas pressurized into this flow passage, the gas is dispersed (mixed) into the liquid milk. By doing so, the predetermined gas can be easily and certainly dispersed into the liquid milk.

As described above, through the gas dispersion step, the density of the liquid milk is decreased, and the apparent volume (bulk) is increased. Incidentally, the density of the liquid milk may be obtained by dividing the weight of the liquid milk by the total volume of the liquid milk at a liquid state and a bubble state. In addition, the density of the liquid milk may be measured using an apparatus measuring a density according to the bulk density measurement (pigment: JIS K 5101 compliant) method based on JIS method.

Therefore, the liquid milk in a state where the predetermined gas is dispersed flows in the flow passage. Herein, the volume flow rate of the liquid milk in the flow passage is preferably controlled to be constant.

In the present embodiment, carbon dioxide (carbon dioxide gas) can be used as the predetermined gas. In the flow passage, the ratio of the volume flow rate of carbon dioxide to the volume flow rate of the liquid milk (hereinafter, the percentage thereof is also referred to as "$CO_2$ mixing ratio [%]") is, for example, 1% or more and 700% or less, preferably 2% or more and 300% or less, more preferably 3% or more and 100% or less, and most preferably 5% or more and 45% or less. As described above, by controlling the volume flow rate of the carbon dioxide to be constant to the volume flow rate of the liquid milk, homogeneousness of the powdered milk produced from this liquid milk can be enhanced. However, when the $CO_2$ mixing ratio is too large, the percentage of the liquid milk flowing in the flow passage is decreased so that the production efficiency of the powdered milk deteriorates. Therefore, the upper limit of the $CO_2$ mixing ratio is preferably 700%. In addition, the pressure for pressurizing the carbon dioxide is not particularly limited as long as it is within a range enabling the carbon dioxide to effectively disperse into the liquid milk, but the atmospheric pressure of the carbon dioxide is, for example, 1.5 atm or more and 10 atm or less and preferably 2 atm or more and 5 atm or less. Incidentally, by mixing continuously (in-line mixing) carbon dioxide and the liquid milk in a seal-up system, it is possible to certainly prevent bacteria or the like from being mixed so that the hygienic status of the powdered milk can be enhanced (or high cleanliness can be maintained).

In the present embodiment, the predetermined gas used in the gas dispersion step was carbon dioxide gas. Instead of carbon dioxide gas or with carbon dioxide gas, one or two or more gases selected from the group consisting of air, nitrogen ($N_2$), and oxygen ($O_2$) may be used or rare gas (for example, argon (Ar) or helium (He)) may be used. As described above, since various gases can be options, the gas dispersion step can be easily performed by using a gas easily available. In the gas dispersion step, when an inert gas such as nitrogen or rare gas is used, there is no possibility to react with nutritional components of the liquid milk or the like, and thus, it is preferable rather than using air or oxygen since there is less possibility to deteriorate the liquid milk. In this case, the ratio of the volume flow rate of the gas to the volume flow rate of the liquid milk is, for example, 1% or more and 700% or less, preferably 1% or more and 500% or less, more preferably 1% or more and 400% or less, and most preferably 1% or more and 300% or less. For example, according to Bell et al, (R. W. BELL, F. P. HANRAHAN, B. H. WEBB: "FOAM SPRAY DRYING METHODS OF MAKING READILY DISPERSIBLE NONFAT DRY MILK", J. Dairy Sci, 46 (12) 1963. pp. 1352-1356), air having about 18.7 times the volume of non-fat milk is dispersed into non-fat milk to obtain a powdered skimmed milk. In the present invention, by dispersing the gas within the above range, a powdered milk having characteristics preferable for producing a solid milk can be obtained. However, to certainly decrease the density of the liquid milk as a result of having dispersed the predetermined gas into a liquid milk in the gas dispersion step, it is preferable to use, as the predetermined gas, a gas which is easily dispersed into the liquid milk or a gas which is easily dissolved in the liquid milk. Therefore, a gas having a high degree of solubility in water (water solubility) is preferably used, and a gas in which a degree of solubility at 20° C. and one atmosphere in 1 $cm^3$ of water is 0.1 $cm^3$ or more is preferred. Incidentally, carbon dioxide is not limited to a gas and may be dry ice or a mixture of dry ice and a gas. That is, in the gas dispersion step, a solid may be used as long as a predetermined gas can be dispersed into the liquid milk. In the gas dispersion step, carbon dioxide can be rapidly dispersed into the liquid milk in a cooling state by using dry ice, and as a result, a powdered milk having characteristics preferable for producing a solid milk can be obtained.

The spray drying step is a step for obtaining a powdered milk (food powder) by evaporating moisture in the liquid milk. The powdered milk obtained in this spray drying step is a powdered milk obtained through the gas dispersion step and spray drying step. This powdered milk is bulky as compared to a powdered milk obtained not through the gas dispersion step. The volume of the former is preferably 1.01 times or more and 10 times or less that of the latter, may be 1.02 times or more and 10 times or less or 1.03 times or more and 9 times or less.

In the spray drying step, the liquid milk is spray dried in a state where the predetermined gas is dispersed into the liquid milk in the gas dispersion step and the density of the liquid milk becomes small. Specifically, it is preferable to spray dry the liquid milk in a state where the volume of the liquid milk after dispersing a gas is 1.05 times or more and 3 times or less, preferably 1.1 times or more and 2 times or less as compared to the volume of the liquid milk before dispersing a gas. That is, in the spray drying step, spray drying is performed after finishing the gas dispersion step. However, immediately after finishing the gas dispersion step, the liquid milk is not homogeneous. Therefore, the spray drying step is performed for 0.1 seconds or longer and 5 seconds or shorter, preferably, 0.5 seconds or longer and 3 seconds or shorter after finishing the gas dispersion step. That is, it is sufficient that the gas dispersion step and the spray drying step are continuously performed. By doing so, the liquid milk is continuously placed in a gas dispersion apparatus to disperse a gas, and the liquid milk into which the gas is dispersed is continuously supplied to a spray drying apparatus and can be continuously spray dried.

In order to evaporate moisture, a spray dryer may be used. Herein, the spray dryer includes a flow passage for flowing a liquid milk, a pressuring pump pressuring the liquid milk for flowing the liquid milk along the flow passage, a dry chamber having a wider room than that of the flow passage connecting to an opening of the flow passage, and a spraying apparatus (a nozzle, an atomizer, or the like) set at the opening of the flow passage. Further, the spray dryer transfers the liquid milk by the pressuring pump toward the dry chamber along the flow passage to be the above volume flow rate, the condensed milk is diffused by the spraying apparatus inside the dry chamber in the vicinity of the opening of the flow passage, and the liquid milk in a liquid drop (atomization) state is dried inside the dry chamber at a high temperature (for example, hot wind). That is, moisture is removed by drying the liquid milk in the dry chamber, and as a result, the condensed milk becomes a solid of a powder state, namely, a powdered milk. Incidentally, the moisture amount or the like in the powdered milk is adjusted by appropriately setting the drying condition in the drying chamber, so that it makes the powdered milk less likely to cohere. In addition, by using the spraying apparatus, the surface area per unit volume of liquid drop is increased so that drying efficiency is enhanced, and at the same time, the particle diameter or the like of the powdered milk is adjusted.

Through the steps as described above, a powdered milk suitable for producing a solid milk can be produced.

The powdered milk obtained as described above is compression molded to form a compression molded body of the powdered milk. Next, the obtained compression molded body of the powdered milk is subjected to, for example, a hardening treatment including a humidification treatment and a drying treatment. As described above, the solid milk 10S can be produced.

In the step of compression molding the powdered milk, a compression means is used. The compression means is, for example, a pressurization molding machine such as a tablet press or a compression testing apparatus. The tablet press is an apparatus including a die serving as a mold in which a powdered milk is input and a punch capable of punching to the die. The compression molding step by the tablet press will be described below.

FIG. 4 is an explanatory view describing positions of a slide plate, an upper punch, and a lower punch of a tablet press. In the compression molding zone of the tablet press, a lower punch 31 is disposed below a die 30A of a slide plate 30 to be vertically movable by an actuator. In addition, an upper punch 32 is disposed above the die 30A of the slide plate 30 to be vertically movable by an actuator. FIG. 4 illustrates the position in which the lower punch 31 and the upper punch 32 are inserted into the die 30A of the slide plate 30 and then the lower punch 31 and the upper punch 32 approach to each other closest. At this position, a distance between the lower punch 31 and the upper punch 32 is the final punch distance L. An inner surface of the die 30A of the slide plate 30, an upper end face of the lower punch 31, and a lower end face of the upper punch 32 constitute a compression molding mold. For example, a powdered milk is supplied to a concave portion configured by the inner surface of the die 30A of the slide plate 30 and an upper face of the lower punch 31, the upper punch 32 is hit from the upper side of the die 30A to apply a compression pressure to the powdered milk, the powdered milk is compression molded in a space SP surrounded by the inner surface of the die 30A of the slide plate 30, the upper end face of the lower punch 31, and the lower end face of the upper punch 32, and thus a compression molded body of the powdered milk can be obtained.

The actuator driving the lower punch 31 and the upper punch 32 up and down is configured, for example, by a servomotor. In the present embodiment, the speed of a servomotor as the actuator can be changed to change the compression speed at the time of compression molding, that is, the moving speeds of the lower punch 31 and the upper punch 32, as will be described below in detail. The actuator is not limited to a servomotor, and the technique to change the moving speeds of the lower punch 31 and the upper punch 32 is not limited thereto. For example, it is also possible to use an oil hydraulic cylinder or the like. In addition, at the time of compression molding, the lower punch 31 and the upper punch 32 may be moved in the direction to approach each other, or it is also possible that one side is fixed, and only the other side is moved.

A step of performing compression molding while changing a compression speed at the time of compression molding, that is, a moving speed of each of the lower punch 31 and the upper punch 32 will be described. At the time of this compression molding, the compression speed at which the upper end face of the lower punch 31 and the lower end face of the upper punch 32 approach to each other is changed (switched). That is, a first compression is first performed at a first compression speed $V_1$, and, following the first compression, a second compression is performed at a second compression speed $V_2$. In the present embodiment, the second compression speed $V_2$ is set to be lower than the first compression speed $V_1$.

The compression distances of the first compression and the second compression are, in this example, as illustrated in FIG. 4, based on the state at the completion of the second compression, that is, at the completion of the entire compression steps. Compression by the lower punch 31 and the upper punch 32 is performed until the punch distance between the upper end face of the lower punch 31 and the lower end face of the upper punch 32 reach the final punch distance L. The final punch distance L is the final thickness of the compression molded body of the powdered milk in the state of being compressed through the entire compression steps. This final punch distance L is determined considering that the compression molded body of the powdered milk expands upon the release of compression, and is smaller than the desired thickness of the compression molded body of the powdered milk or the same as the desired thickness.

The tablet press of the embodiment is controlled during the changeover between the first and second compression so that both sides of the lower punch 31 and upper punch 32 are in close contact with the compressed body and the pressure on the compressed body is not relieved. On the other hand, in the known tablet press (for example, a tablet press described in JP-A-2008-290145), the pressure is controlled to relieved once after preload is applied for the purpose of releasing the air contained in the compressed body and then the main pressure is applied to mold the compressed body. The tablet press used in the embodiment differs from the existing tablet presses in that it compresses the compressed body without releasing the pressure between the first and second compressions and by bringing both sides of the lower and upper punches 31 and 32 in close contact with the compressed body, thus allowing sufficient hardness of the compressed body.

Figure 5:
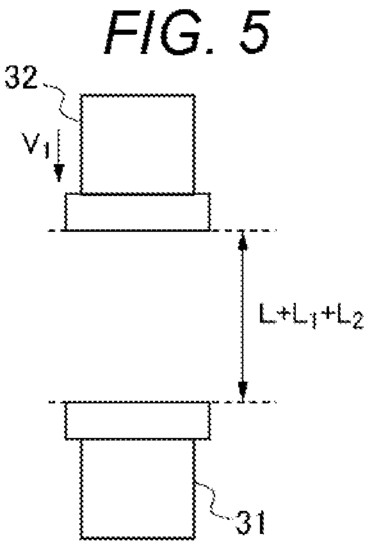
FIG. 5 is an explanatory view describing positions of the upper punch and the lower punch at the start of a first compression.
Figure 6:
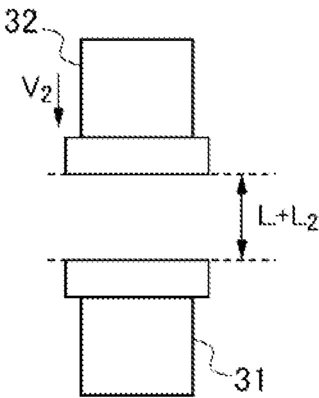
FIG. 6 is an explanatory view describing positions of the upper punch and the lower punch at the completion of the first compression and at the start of a second compression.

FIG. 5 illustrates positions of the lower punch 31 and the upper punch 32 at the start of the first compression. FIG. 6 illustrates positions of the lower punch 31 and the upper punch 32 at the completion of the first compression and at the start of the second compression. Compression from the state of the punch distance illustrated in FIG. 5 ($L+L_1+L_2$) to the state of the punch distance illustrated in FIG. 6 ($L+L_2$) is the first compression. In addition, compression from the state of the punch distance illustrated in FIG. 6 ($L+L_2$) to the state of the final punch distance L illustrated in FIG. 4 is the second compression.

The first compression distance $L_1$ of the first compression is the distance in which the punch distance decreases in the first compression. The second compression distance $L_2$ of the second compression is the distance in which the punch distance decreases in the second compression. Since the second compression is performed following the first compression without releasing the compression, the second compression distance $L_2$ is the compression distance from the punch distance ($L+L_2$) compressed in the first compression to the final punch distance (L).

The rate of change in the punch distance in the first compression is the first compression speed $V_1$, and the rate of change in the punch distance in the second compression is the second compression speed $V_2$. Incidentally, in a case where the rate of change in the punch distance varies during the first compression or the second compression, the average rate is defined as the first compression speed $V_1$ or the second compression speed $V_2$.

When the second compression is performed after the first compression at the second compression speed $V_2$ that is lower than the first compression speed $V_1$, as compared with a case where the compression is performed at the same compression speed as the first compression speed $V_1$ with the same compression distance ($L_1+L_2$), the hardness of the compression molded body of the powdered milk is increased and thus resistance to breakage can be secured. Moreover, since the second compression is performed continuously to the first compression and the second compression distance $L_2$ can be shortened, production can be performed with further improved production efficiency while having a high strength at the same level as that in the case of performing production only at the second compression speed $V_2$.

In the present embodiment, in order to efficiently enhance the hardness of the compression molded body of the powdered milk, the mode of the second compression, that is, the combination of the second compression speed $V_2$ with the second compression distance $L_2$, is determined in such a manner to satisfy the second compression conditions under which, upon the compression of the compression molded body of the powdered milk from the state of being compressed in the first compression, the compression molded body of the powdered milk is compressed to such a state that the rate of change in the hardness of the compression molded body of the powdered milk relative to the compression distance decreases.

As described above, the compression molding step is performed by combining the first compression performed at the first compression speed $V_1$ and the second compression performed at the second compression speed $V_2$ that is lower than the first compression speed $V_1$, such that the hardness of the compression molded body of the powdered milk can be efficiently improved while suppressing an increase in compression time.

The compression molding step performed by combining the first compression and the second compression is described in the above, but the whole compression molding step may be performed only at the first compression speed $V_1$. Alternatively, the compression molding step may be performed at only the second compression speed $V_2$.

The present inventors have examined compression molded bodies of the powdered milk obtained from various combinations of the first compression speed $V_1$, the first compression distance $L_1$, the second compression speed $V_2$, and the second compression distance $L_2$. As a result, they have found that when the second compression speed $V_2$ is set to be lower than the first compression speed $V_1$, there exists a specific point at which the rate of change in the hardness of a compression molded body of the powdered milk (rate of increase) relative to change in the second compression distance $L_2$ decreases (hereinafter referred to as "hardness specific point"). In addition, the inventors have also found that the second compression distance $L_2$ corresponding to the hardness specific point changes with the first compression speed $V_1$ and is also affected by the second compression speed $V_2$.

The hardness specific point exists presumably because of the change from a compression state where the rearrangement of particles of the powdered milk in the inner part of the compression molded body of the powdered milk is dominant to another compression state where plastic deformation in the inner part of the compression molded body of the powdered milk is dominant. In addition, presumably, because an increase in the first compression speed $V_1$ increases the energy required for plastic deformation in the inner part of the compression molded body of the powdered milk, the second compression distance $L_2$ corresponding to the hardness specific point changes according to the first compression speed $V_1$, and also such a second compression distance $L_2$ is affected by the second compression speed $V_2$.

Based on the above findings, the second compression is performed so as to satisfy the second compression conditions, whereby the hardness of the compression molded body of the powdered milk is efficiently and significantly improved while suppressing an increase in the compression time.

It is also preferable that the compression speed ratio ($=V_1/V_2$), which is the ratio of the first compression speed $V_1$ to the second compression speed $V_2$, is set to 5 or more. When the compression speed ratio is set to 5 or more, the hardness of the compression molded body of the powdered milk can be significantly increased. The compression speed ratio may be 5 or more, and for example, is 10 or more, 20 or more, 25 or more, 50 or more, 100 or more, 250 or more, or 500 or more.

Preferably, the first compression speed $V_1$ is set in the range of 1.0 mm/s or more and 100.0 mm/s or less, and the first compression distance $L_1$ is set in the range of 5.0 mm or more and 10.0 mm or less, and the second compression speed $V_2$ is set in the range of 0.25 mm/s or more and 50.0 mm/s or less, and the second compression distance $L_2$ is set in the range of 0.2 mm or more and 1.6 mm or less.

The configuration of the tablet press described above is an example, and the configuration is not limited as long as compression can be performed at different compression speeds between the first compression and the second compression. In addition, although compression to the final thickness is performed in the second compression in this example, it is also possible to perform further compression at a rate changed from the second compression speed following the second compression. In this case, the compression molded body of the powdered milk is compressed to the final thickness by the compression later than the second compression.

The configuration of the tablet press other than the above-described configuration is, for example, the same of the tablet press described in PTL 3. For example, the die 30A of the slide plate in which the compression molding has been performed is moved to a removal zone. In the removal zone of the tablet press, the lower punch 31 and the upper punch 32 are removed from the die 30A of the slide plate 30, and the compression molded body of the powdered milk is extruded by an extrusion part. The extruded compression molded body of the powdered milk is collected by a collection tray. In the tablet press, a powdered milk supply part to the die 30A of the slide plate 30 is, for example, realized by an apparatus including a funnel supplying a powdered milk from a bottom opening to the die 30A.

In the step of compression molding the powdered milk, the ambient temperature is not particularly limited, and may be, for example, room temperature. Specifically, the ambient temperature is, for example, 5° C. to 35° C. The ambient humidity is, for example, a relative humidity of 0% RH to 60% RH. The compression pressure is, for example, 1 MPa to 30 MPa, preferably 1 MPa to 20 MPa. In particular, at the time of solidifying the powdered milk, it is preferable that the compression pressure is adjusted within a range of 1 MPa to 30 MPa and the hardness of the compression molded body of the powdered milk is controlled within a range of 4 N or more and less than 20 N. According to this, it is possible to produce a high utility solid milk 10S having convenience (easy handleability). Incidentally, the compression molded body of the powdered milk has such a hardness (for example, 4 N or more) that the shape of the compression molded body of the powdered milk is not collapsed in at least the subsequent humidification step and drying step. For example, a preferred range of the fracture stress of the compression molded body of the powdered milk is 0.014 $N/mm^2$ or more and less than 0.067 $N/mm^2$, considering the range of the fractured area.

The humidification treatment is a step of subjecting the compression molded body of the powdered milk obtained by the compression molding step to the humidification treatment. When the compression molded body of the powdered milk is humidified, tackiness is generated on the surface of the compression molded body of the powdered milk. As a result, some of the powder particles in the vicinity of the surface of the compression molded body of the powdered milk become a liquid or a gel and are cross-linked to each other. Then, by performing drying in this state, the strength in the vicinity of the surface of the compression molded body of the powdered milk can be increased as compared to the strength of the inner part. The degree of cross-linking (degree of broadening) is adjusted by adjusting time at which the compression molded body of the powdered milk is put under a high-humidity environment (humidification time), and according to this, the hardness (for example, 4 N or more and less than 20 N) of the compression molded body of the powdered milk before the humidification step (unhardened solid milk 10S) can be increased to a target hardness (for example, 40 N) necessary as the solid milk 10S. However, the range (width) of the hardness that can be increased by adjusting the humidification time is limited. That is, when the compression molded body of the powdered milk is transported by a belt conveyer or the like to humidify the compression molded body of the powdered milk obtained after the compression molding, if the hardness of the compression molded body of the powdered milk is not sufficient, the shape of the solid milk 10S is not kept. In addition, if the hardness of the compression molded body of the powdered milk is too high during the compression molding, only the solid milk 10S having a small porosity and poor solubility is obtainable. Therefore, it is preferable to perform the compression molding so that the hardness of the compression molded body of the powdered milk before the humidification step (unhardened solid milk 10S) is sufficiently high and the solubility of the solid milk 10S is sufficiently kept.

In the humidification treatment, a humidification method of the compression molded body of the powdered milk is not particularly limited, and for example, a method of placing a compression molded body of the powdered milk under a high-humidity environment, a method of directly spraying water or the like to a compression molded body of the powdered milk, a method of blowing steam to a compression molded body of the powdered milk, and the like are mentioned. Examples of humidification means to humidify the compression molded body of the powdered milk include a high-humidity chamber, a sprayer, and steam.

In a case where the compression molded body of the powdered milk is placed under a high-humidity environment, the compression molded body of the powdered milk is placed under an environment of a relative humidity of 100% RH or less and a temperature of higher than 100° C. In a case where the compression molded body of the powdered milk is placed under a high-humidity environment, the temperature is preferably 330° C. or lower, more preferably 110° C. or higher and 280° C. or lower, further preferably 120° C. or higher and 240° C. or lower, and most preferably 130° C. or higher and 210° C. or lower. In a case where the compression molded body of the powdered milk is placed under a high-humidity environment, the humidity is preferably 0.1% RH or more and 20% RH or less, more preferably 1% RH or more and 15% RH or less, further preferably 1.5% RH or more and 12% RH or less, and most preferably 2% RH or more and 10% RH or less. In a case where the compression molded body of the powdered milk is placed under a high-humidity environment, the treatment time is not particular restricted, and is, for example, 0.1 seconds or longer and 30 seconds or shorter, preferably 4.4 seconds or longer and 20 seconds or shorter, more preferably 4.4 seconds or longer and 12 seconds or shorter, and further preferably 5 seconds or longer and 10 seconds or shorter. The treatment time can be appropriately selected so that the hardness of the solid milk obtained after a drying treatment described below is within a specific range. In the humidification conditions, there are temperature, humidity, and time, as the temperature is higher, the humidity is higher, and the time is longer, the humidification effect is enhanced, and as the temperature is lower, the humidity is lower, and the time is shorter, the humidification effect is weakened.

Preferred examples of the humidification condition include the following combinations. The temperature is higher than 100° C. and 330° C. or lower, the relative humidity is 0.1% RH or more and 20% RH or less, and the treatment time is 0.1 seconds or longer and 30 seconds or shorter. Preferably, the temperature is higher than 110° C. and 280° C. or lower, the relative humidity is 1% RH or more and 18% RH or less, and the treatment time is 1 second or longer and 20 seconds or shorter. More preferably, the temperature is higher than 120° C. and 240° C. or lower, the relative humidity is 1.5% RH or more and 17% RH or less, and the treatment time is 2 seconds or longer and 18 seconds or shorter. More preferably, the temperature is higher than 120° C. and 240° C. or lower, the relative humidity is 1.5% RH or more and 16% RH or less, and the treatment time is 3 seconds or longer and 16 seconds or shorter. Still more preferably, the temperature is higher than 125° C. and 230° C. or lower, the relative humidity is 2% RH or more and 16% RH or less, and the treatment time is 4 seconds or longer and 14 seconds or shorter. Further still more preferably, the temperature is higher than 130° C. and 210° C. or lower, the relative humidity is 2% RH or more and 10% RH or less, and the treatment time is 5 seconds or longer and 10 seconds or shorter. This combination condition enables, for example, efficient humidification in a short time.

The reason why the temperature environment is set to higher than 100° C. in the embodiment will be described. As described in PTL 2 described above, a conventional humidification and drying method uses humidified air at 100° C. or lower. The reason for this is that since the temperature of saturated water vapor under normal pressure (atmospheric pressure) is 100° C., the temperature of water vapor under normal pressure is 100° C. or lower unless a specific operation is performed. Considering actual production, a treatment in an airtight pressure container is necessary in order to create a high-pressure environment that is not normal pressure, production efficiency is decreased due to a batch treatment or the like, and thus it is desirable that the treatment can be continuously performed under a normal-pressure environment.

On the other hand, in drying techniques in recent years, superheated water vapor drying using "superheated water vapor" obtained by further heating the generated water vapor to a temperature higher than a boiling point (higher than 100° C. under normal pressure) by a heater or the like is also used. The superheated water vapor is used since the drying efficiency using thermal energy thereof is high, but in the present embodiment, this superheated water vapor is used in the humidification step. According to this, humidified air of higher than 100° C. in which humidity is controlled even under normal pressure (101° C. or higher in the meaning of being controlled) can be used. Specifically, the humidity can be adjusted by adjusting the amount of water vapor to be generated (to be charged), and the temperature can be adjusted by the heat quantity of the heater. In an actual humidification step, the hardness is adjusted by three conditions of temperature, humidity, and time.

In this regards, the relative humidity can be measured with a commercial hygrometer. For example, up to 180° C. it can be measured with the hygrometer HMT330 from Vaisala, and up to 350° C. with the dew point transmitters DMT345 from Vaisala. In addition, the relative humidity may also be converted by measuring the absolute humidity (volumetric absolute humidity (the unit is $g/m^3$) or weight absolute humidity (the unit is kg/kg (DA), where DA represents dry air) and calculating the ratio (%) of water vapor partial pressure to saturation water vapor pressure at that temperature.

The moisture amount (hereinafter, also referred to as "amount of humidification") to be added to the compression molded body of the powdered milk in the humidification treatment can be appropriately adjusted. The amount of humidification is preferably 0.5% by weight to 3% by weight of the mass of the compression molded body of the powdered milk obtained after the compression molding step. When the amount of humidification is set to less than 0.5% by weight, it is not possible to provide a sufficient hardness (tablet hardness) to the solid milk 10S, which is not preferred. In addition, when the amount of humidification is more than 3% by weight, the compression molded body of the powdered milk is excessively dissolved into a liquid state or a gelled state so that the compression molded body of the powdered milk is deformed from the compression molded shape or is attached to an apparatus such as a belt conveyer during transporting, which is not preferable.

The drying treatment is a step for drying the compression molded body of the powdered milk humidified in the humidification treatment. According to this, surface tackiness on the compression molded body of the powdered milk is eliminated so that the solid milk 10S is easily handled. That is, the humidification treatment and the drying treatment correspond to a step of providing desired characteristics or quality as the solid milk 10S by increasing the hardness of the compression molded body of the powdered milk obtained after the compression molding.

In the drying treatment, a drying method of the compression molded body of the powdered milk is not particularly limited, and a known method capable of drying the compression molded body of the powdered milk obtained through the humidification treatment can be employed. For example, a method of placing the compression molded body of the powdered milk under a low-humidity and high-temperature condition, a method of bringing the compression molded body of the powdered milk into contact with dry air or high-temperature dry air, and the like are mentioned.

In a case where the compression molded body of the powdered milk is placed under a low-humidity and high-temperature environment, the compression molded body of the powdered milk is placed under an environment of a relative humidity of 0% RH or more and 30% RH or less and a temperature of 80° C. or higher and 330° C. or lower. The temperature in the case where the compression molded body of the powdered milk is placed under the low-humidity and high-temperature environment is, for example, 330° C. The treatment time in the case where the compression molded body of the powdered milk is placed under the low-humidity and high-temperature environment is not particular restricted, and is, for example, 0.1 seconds or longer and 100 seconds or shorter.

Incidentally, the humidification treatment and the drying treatment can be performed as separate steps under conditions in which the temperatures or humidities are difference from each other as described above, and in this case, the humidification treatment and the drying treatment can be continuously performed. In addition, the humidification treatment and the drying treatment can also be performed under the same temperature and humidity, and in this case, the humidification treatment and the drying treatment can be performed at the same time. For example, the compression molded body of the powdered milk is placed under a first temperature and humidity environment in which humidification and drying are performed at the same time, and subsequently, the compression molded body of the powdered milk is placed under a second temperature and humidity environment in which drying is only performed. The transition from the first temperature and humidity to the second temperature and humidity is a period of transition from a state where the humidification and drying of the compression molded body of the powdered milk are performed at the same time to a state where the drying of the compression molded body of the powdered milk is only performed.

When the moisture contained in the solid milk 10S is large, storage stability deteriorates and it is easy for deterioration in the flavor and the discoloration of appearance to progress. Therefore, in the drying step, the moisture content ratio of the solid milk 10S is preferably controlled (adjusted) to be no more than 1% higher or lower than the moisture content ratio of the powdered milk used as a raw material by controlling the conditions such as a drying temperature and a drying time.

The solid milk 10S produced in this way is generally dissolved in warm water and drunk. Specifically, warm water is poured into a container or the like provided with a lid and then the necessary number of pieces of the solid milk 10S are placed therein, or the warm water is poured after the pieces of the solid milk 10S are placed. Then, preferably, the solid milk 10S is rapidly dissolved by lightly shaking the container and drunk in a state with an appropriate temperature. Further, preferably, when one to several pieces of the solid milks 10S (more preferably one piece of the solid milk 10S) are dissolved in warm water, the volume of the solid milk 10S may be adjusted to be a necessary amount of the liquid milk for one drinking, for example, to be 1 $cm^3$ to 50 $cm^3$. Incidentally, by changing the amount of the powdered milk used in the compression molding step, the volume of the solid milk 10S can be adjusted.

By performing the hardening treatment including the humidification treatment at a temperature of, for example, higher than 100° C. and 330° C. or lower as described above, it is possible to produce a solid milk configured such that an increase Yb (% by weight) in total crystallization rate that is a difference of a crystal ratio with respect to a total weight at a depth Xb (mm) from a surface of the solid milk relative to a crystal ratio in an inner part of the solid milk satisfies the following Formula (1).

(Action and Effect of Solid Milk 10S)

The solid milk 10S of the present embodiment is a solid milk having a solid form obtained by compression molding a powdered milk, in which an increase Yb (% by weight) in total crystallization rate that is a difference of a crystal ratio with respect to a total weight at a depth Xb (mm) from a surface of the solid milk 10S relative to a crystal ratio in an inner part of the solid milk satisfies the above Formula (1).

A case where a compression molded body of a powdered milk obtained by compression molding a powdered milk is humidified at a temperature of, for example, 100° C. or lower will be described. An increase Ybr (% by weight) in total crystallization rate is represented by the following Formula (1r), the increase Ybr in total crystallization rate being a difference of a crystal ratio with respect to a total weight at a depth Xbr (mm) from a surface of a solid milk 10Sr produced by performing a hardening treatment including a humidification treatment at a temperature of 100° C. or lower relative to a crystal ratio in an inner part of the solid milk.

$$Ybr=-5.24Xbr+6.65 \tag{1r}$$

As can be seen from the comparison between Formula (1) and Formula (1r), the increase Yb in total crystallization rate of the solid milk 10S of the present embodiment is smaller than the increase Ybr in total crystallization rate of the solid milk 10Sr produced by performing the hardening treatment including the humidification treatment in which humidification is performed at a temperature of 100° C. or lower from the surface of the solid milk to the inner part of the solid milk. That is, in the solid milk 10S of the present embodiment, the influence of the humidification treatment (hardening treatment) on the inner part of the solid milk is small.

Such a solid milk 10S satisfies the above Formula (1) and has a small increase in total crystallization rate, such that suitable solubility can be implemented and strength adequate to resist breakage during handling can be sufficiently secured even in a hardening treatment in which the inner part of the solid milk is hardly affected.

In a case where the solid milk 10S satisfies the above Formula (2), the increase in total crystallization rate is further small, such that suitable solubility can be realized.

The reason why solubility is improved by setting the humidification treatment condition for hardening to be higher than 100° C. is considered that, when the hardening treatment in which the humidification treatment condition is set to be higher than 100° C. is performed, a cross-linked structure generated by some of powder particles being a liquid or a gel by humidification is a structure having further higher solubility than a cross-linked structure generated by a conventional method in which the humidification treatment is performed at 100° C. or lower. More specifically, some of powder particles in the vicinity of the surface of the compression molded body of the powdered milk are softened by humidification at higher than 100° C., sugars become a non-crystalline rubber state, the sugars are cross-linked to each other at a contact point of particles adjacent to each other as a base point and then dried so as to be vitrified (solidified at a non-crystalline state) etc., and thus a structure having further higher solubility is obtained.

Second Embodiment

Solid milk is a type of solid food. The first embodiment described above relates to the compression molded body of the powdered milk obtained by compression molding the powdered milk and the solid milk obtained by hardening the compression molded body of the powdered milk, but the present invention is not limited thereto. In the present embodiment, the present invention is applied to a compression molded body of a food powder obtained by compression molding the food powder and a solid food obtained by hardening the compression molded body of the food powder.

For the above-described food powder, in addition to the powdered milk, for example, protein powders such as whey protein, soybean protein, and collagen peptide, amino acid powders, and oil and fat-containing powders such as MCT oil can be used. The food powder may be appropriately added with milk sugar or other sugars. Other than milk sugar or other sugars, nutritional components such as fats, proteins, minerals, and vitamins or food additives may be added to the food powder.

A compression molded body of the food powder can be formed by compression molding the food powder into a desired shape. A solid food can be formed by hardening the obtained compression molded body of the food powder. The solid food can be produced by performing the hardening treatment including the same humidification treatment as in the first embodiment, except that the above-described food powder is used as a raw material. That is, in the humidification treatment step, a humidification treatment is performed on a compression molded body of a food powder at a temperature of higher than 100° C. and 330° C. or lower.

As for the compression molded body of the food powder obtained by compression molding the food powder and the solid food obtained by hardening the compression molded body of the food powder, the hardness can be measured using the hardness tester described in the first embodiment. A preferred hardness of the compression molded body of the food powder is 4 N or more and less than 20 N, and a preferred hardness of the solid food is 20 N or more and 100 N or less. In addition, a preferred fracture stress of the compression molded body of the food powder is 0.014 $N/mm^2$ or more and less than 0.067 $N/mm^2$, and a preferred fracture stress of the solid food is 0.067 $N/mm^2$ or more and 0.739 $N/mm^2$ or less.

The solid food of the present embodiment is configured such that an increase Ya (% by weight) in total crystallization rate that is a difference of a crystal ratio with respect to a total weight at a depth Xa (mm) from a surface of the solid food relative to a crystal ratio in an inner part of the solid food satisfies the following Formula (1A). Such a solid food can be produced by performing a hardening treatment including a humidification treatment on a compression molded body of a food powder obtained by compression molding a food powder at a temperature of, for example, higher than 100° C. and 330° C. or lower, and suitable solubility can be implemented by securing strength adequate to resist breakage during handling.

$$Ya<-5.24Xa+6.65 \tag{1A}$$

In the solid food of the present embodiment, it is preferable that the increase Ya (% by weight) in total crystallization rate at the depth Xa (mm) from the surface of the solid food satisfies the following Formula (1A-1).

$$Ya<-5.24Xa+6.15 \quad (1A\text{-}1)$$

It is more preferable that the increase Ya (% by weight) in total crystallization rate satisfies the following Formula (1A-2).

$$Ya<-5.24Xa+5.65 \quad (1A\text{-}2)$$

In the solid food of the present embodiment, it is preferable that the increase Ya (% by weight) in total crystallization rate at the depth Xa (mm) from the surface of the solid food satisfies the following Formula (2A).

$$Ya\leq 6.34Xa^2-11.15Xa+5.05 \quad (2A)$$

It is more preferable that the increase Ya (% by weight) in total crystallization rate satisfies the following Formula (2A-1).

$$Ya\leq 4.89Xa^2-8.39Xa+3.51 \quad (2A\text{-}1)$$

It is still more preferable that the increase Ya (% by weight) in total crystallization rate satisfies the following Formula (2A-2).

$$Ya\leq 6.40Xa^2-7.59Xa+2.28 (2A\text{-}2)$$

Further, the protein powders of the food powder may be milk casein, meat powder, fish powder, egg powder, wheat protein, wheat protein decomposition product, or the like. One kind or two or more kinds of these protein powders may be added.

Further, the whey protein of the food powder is a generic term for proteins other than casein in milk. It may be classified as whey proteins. Whey protein is composed of a plurality of components such as lactoglobulin, lactalbumin, and lactoferrin. When a milk raw material such as milk is adjusted to be acidic, a protein to be precipitated is casein, and a protein not to be precipitated is whey protein. Examples of the powder raw material containing whey proteins include WPC (whey protein concentrate, protein content: 75 to 85% by mass) and WPI (whey protein isolate, protein content: 85% by mass or more). One kind or two or more kinds of these may be added.

Further, the soybean protein (soybean protein) of the food powder may be a protein contained in soybean or may be extracted from soybean. It is also possible to use those purified from raw material soybeans. The purification method is not particularly limited, and a conventionally known method can be used. As such a soybean protein, a powder commercially available as a material for food and drink, a material for medical use, or a supplement food can be used. One kind or two or more kinds of these may be added.

The amino acids contained in the amino acid powders of the food powder are not particularly limited, and examples thereof include arginine, lysine, ornithine, phenylalanine, tyrosine, valine, methionine, leucine, isoleucine, tryptophan, histidine, proline, cysteine, glutamic acid, asparagine, aspartic acid, serine, glutamine, citrulline, creatine, methyllysine, acetyllysine, hydroxylysine, hydroxyproline, glycine, alanine, threonine, and cystine. One kind or two or more kinds of these may be added.

The amino acids contained in the amino acid powder of the food powder may be either a natural product or a synthetic product, and a single amino acid or a mixture of a plurality of amino acids can be used. In addition, as the amino acids, not only free amino acids but also salts such as sodium salt, hydrochloride and acetate, and derivatives such as carnitine and ornithine can be used.

In the description herein, the term "amino acids" includes α-amino acids, β-amino acids, and γ-amino acids. The amino acids may be either L-form or D-form.

Further, the oils and fats contained in the oil and fat-containing powders of the food powder are animal oils and fats, vegetable oils and fats, and fractionated oils, hydrogenated oils, and transesterified oils thereof, in addition to the MCT oil described above. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

Further, the sugars of the food powder are, for example, oligosaccharides, monosaccharides, polysaccharides, artificial sweeteners, or the like, in addition to the milk sugar described above. One kind or two or more kinds of these may be added. Oligosaccharides are, for example, milk sugar, cane sugar, malt sugar, galacto-oligosaccharides, fructo-oligosaccharides, lactulose, and the like. Monosaccharides are, for example, grape sugar, fruit sugar, galactose, and the like. Polysaccharides are, for example, starch, soluble polysaccharides, dextrin, and the like.

Further, as an example of the food additives of the food powder, sweeteners can be exemplified. The sweeteners may be any sweetener commonly used in foods and pharmaceuticals, and may be either a natural sweetener or a synthetic sweetener. The sweeteners are not particularly limited, and examples thereof include glucose, fructose, maltose, sucrose, oligosaccharide, sugar, granulated sugar, maple syrup, honey, molasses, trehalose, palatinose, maltitol, xylitol, sorbitol, glycerin, aspartame, advantame, neotame, sucralose, acesulfame potassium, and saccharin.

Further, as an example of the food additives of the food powder, acidulants can be exemplified. The acidulants are not particularly limited, and examples thereof include acetic acid, citric acid, anhydrous citric acid, adipic acid, succinic acid, lactic acid, malic acid, phosphoric acid, gluconic acid, tartaric acid, and salts thereof. The acidulants can suppress (mask) bitterness caused by the type of the amino acids.

Further, the food powder may contain any components such as fats, proteins, minerals, and vitamins as nutritional components.

Examples of the fats include animal oils and fats, vegetable oils and fats, fractionated oils, hydrogenated oils, and transesterified oils thereof. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

The proteins, for example, milk proteins and milk protein fractions, animal proteins, vegetable proteins, peptides and amino acids of various chain length obtained by decomposing those proteins with enzymes etc., and the like. One kind or two or more kinds of these may be added. Milk proteins are, for example, casein, whey proteins (α-lactoalbumin, β-lactoglobulin, and the like), for example, whey protein concentrate (WPC), whey protein isolate (WPI), and the like. Examples of the animal proteins include egg protein (egg powder), meat powder, and fish powder. Examples of the vegetable proteins include soybean protein and wheat protein. Examples of the peptides include a collagen peptide.

Examples of the amino acids include taurine, cystine, cysteine, arginine, and glutamine. One kind or two or more kinds of these may be added.

Examples of the minerals include iron, sodium, potassium, calcium, magnesium, phosphorus, chlorine, zinc, iron, copper, and selenium. One kind or two or more kinds of these may be added.

Examples of the vitamins include vitamin A, vitamin D, vitamin E, vitamin K, vitamin B1, vitamin B2, vitamin B6, vitamin B12, vitamin C, niacin, folic acid, pantothenic acid, and biotin. One kind or two or more kinds of these may be added.

Examples of other food materials include cocoa powder, cacao powder, chocolate powder, microorganism powder containing useful microorganisms such as lactic acid bacteria and bifidobacteria, milk fermented ingredient powder made from a culture obtained by adding microorganisms to milk and fermenting the mixture, cheese powder having cheese as a powder, functional food powder having functional food as a powder, and total nutrition food powder having total nutrition food as a powder. One kind or two or more kinds of these may be added.

The solid food according to the present invention may be in the form of a food for daily ingestion, a health food, a health supplement food, a health functional food, a food for specified health use, a nutrient functional food, a supplement, a function-indicating food, or the like.

The solid food dissolved in water is also referred to as a solid dissolvable food.

In a case where the food powder includes a water-soluble material or a water-absorbing raw material, when the compression molded body of the food powder obtained by compression molding food powder is humidified, tackiness is generated on the surface of the compression molded body of the food powder. Examples of such a food powder can include food powders including polysaccharides sugar, dextrin, natural sugar (trehalose or the like), and polysaccharides. In addition, when the compression molded body of the food powder is humidified, any food powder can be preferably applied as long as it is a food powder that can cause tackiness on the surface of the compression molded body of the food powder.

(Action and Effect of Solid Food)

A solid food of the present embodiment is a solid food having a solid form obtained by compression molding a food powder, in which an increase Ya (% by weight) in total crystallization rate that is a difference of a crystal ratio with respect to a total weight at a depth Xa (mm) from a surface of the solid food relative to a crystal ratio in an inner part of the solid food satisfies the following Formula (1A).

A case where a compression molded body of a food powder obtained by compression molding a food powder is humidified at a temperature of, for example, 100° C. or lower will be described. An increase Yar (% by weight) in total crystallization rate is represented by the following Formula (1Ar), the increase Yar in total crystallization rate being a difference of a crystal ratio with respect to a total weight at a depth Xar (mm) from a surface of a solid food produced by performing a hardening treatment including a humidification treatment in which humidification is performed at a temperature of 100° C. or lower relative to a crystal ratio in an inner part of the solid food.

$$Yar=-5.24Xar+6.65 \quad (1Ar)$$

As can be seen from the comparison between Formula (1A) and Formula (1Ar), the increase Ya in total crystallization rate of the solid food of the present embodiment is smaller than that of the solid food produced by performing the hardening treatment including the humidification treatment in which humidification is performed at a temperature of 100° C. or lower from the surface of the solid food to the inner part of the solid food. That is, in the solid food of the present embodiment, the influence of the humidification treatment (hardening treatment) on the inner part of the solid food is small.

Such a solid food satisfies the above Formula (1A) and has a small increase in total crystallization rate, such that suitable solubility can be realized and strength adequate to resist breakage during handling can be sufficiently secured even in a hardening treatment in which the inner part of the solid food is hardly affected.

In a case where the solid food satisfies the above Formula (2A), the increase in total crystallization rate is further small, such that suitable solubility can be realized.

First Example

Preparation of Each of Example 1, Example 2, and Example 3

A solid milk sample having a rectangular parallelepiped shape in which a side a in an X-axis direction is 31 mm, a side b in a Y-axis direction is 24 mm, and a side c in a Z-axis direction is 12.5 mm was prepared as each of Examples. The sizes of a die and a punch of a tablet press were adjusted to obtain the above-described sizes, and 5.4 g of a powdered milk was compression molded to form a compression molded body of the powdered milk. In the compression molding, the first compression in which the first compression distance $L_1$ was set to 12.6 mm and the first compression speed $V_1$ was set to 120 mm/s was performed and then the second compression in which the second compression distance $L_2$ was set to 0.6 mm and the second compression speed $V_2$ was set to 1.2 mm/s was performed. The compression molded body of the powdered milk thus obtained was subjected to a humidification treatment at a humidification temperature (humidification time) of 101° C. (9.2 seconds) and was further subjected to a drying treatment at a drying temperature of 80° C., thereby obtaining a solid milk sample subjected to a hardening treatment according to Example 1. As for the drying time, the time was adjusted so that the amount corresponding to the increased weight at the time of humidification was dried out. Similarly, the humidification temperature (humidification time) was set to 200° C. (7.6 seconds) to obtain a solid milk sample according to Example 2. In addition, the humidification temperature (humidification time) was set to 300° C. (5.6 seconds) to obtain a solid milk sample according to Example 3.

Preparation of Comparative Example

A solid milk sample different from that of each of Examples only in that the humidification treatment in the hardening treatment was performed at 75° C. (45 seconds) and used as Comparative Example.

(Hardness of Each Sample)

The hardness evaluation of each sample of the solid milks according to Examples 1 to 3 and Comparative Example was performed using the above-described load cell tablet hardness tester. The hardness of each sample was about 50 N (the fracture stress was about 0.167 N/mm$^2$) and was sufficiently secured, and each same had hardness adequate to resist breakage during handling.

(Measurement of Increase in Total Crystallization Rate of Each Sample)

For each sample of the solid milk according to each of Examples 1 to 3 and Comparative Example described above, a profile of an increase Y in total crystallization rate in a direction of a depth X from a surface of the solid milk was determined by an X-ray diffraction (XRD) method. The increase in total crystallization rate is a difference of the crystal ratio with respect to the total weight in each depth from the surface of the solid milk relative to the crystal ratio in the inner part of the solid milk. Here, the weight (% by weight) of α-lactose crystals or β-lactose crystals per unit weight as crystals was determined.

The increase in total crystallization rate of each sample was measured by diffraction intensity on a surface exposed by cutting the surface of the solid milk by a thickness of 0.1 mm using a powder X-ray diffraction apparatus (XRD, SmartLab, Rigaku Corporation). The measurement method was a general method (concentration method), and the measurement was performed under the slit conditions such as the scan axis (2θ/θ), the mode (step), the range designation (absolute), the start (9.0000 deg), the end (13.5000 deg), the step (0.0200 deg), the speedometer count time (2.4), IS (1.000 deg), RSI (1.000 deg), RS2 (0.300 mm), the attenuator (open), the tube voltage (40 kv), and the tube current (30 mA).

As an analysis method, a weighted average (smoothed 7 points) BG removal (sonneveld-Visser method) processing was performed using analysis software "SmartLab StudioII", and then integrated intensity calculation (intrinsic peak of α-lactose crystal: 12.5, intrinsic peak of β-lactose crystal: 10.5) was performed. The increase in total crystallization rate is a difference of the crystal ratio with respect to the total weight in each depth from the surface of the solid milk relative to the crystal ratio in the inner part of the solid milk. Here, the weight (% by weight) of α-lactose crystals or β-lactose crystals per unit weight as crystals was determined.

Figure 7:
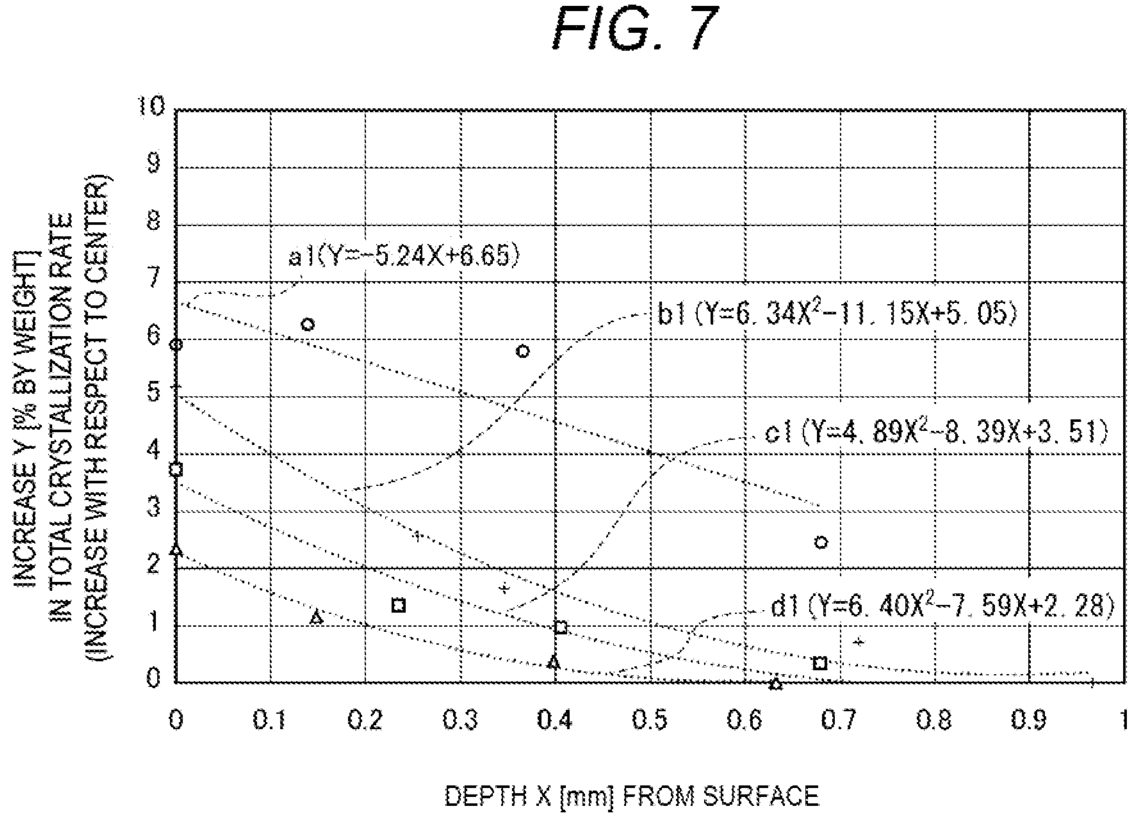
FIG. 7 is a graph showing an increase Y (increase with respect to the center) in total crystallization rate with respect to a depth X (mm) from a surface of a solid milk according to Example.

FIG. 7 is a graph showing the increase Y (increase with respect to the center) in total crystallization rate with respect to the depth X (mm) from the surface of the solid milk according to Example. The increase in total crystallization rate of Comparative Examples is indicated by the symbol "○", and a graph obtained by approximating the increase in total crystallization rate by a least square method is indicated by a straight line al ($Y=-5.24X+6.65$). The increase in total crystallization rate of Example 1 is indicated by the symbol "+", and a graph obtained by approximating the increase in total crystallization rate by a least square method is indicated by a straight line b1 ($Y=6.34X^2-11.15X+5.05$). The increase in total crystallization rate of Example 2 is indicated by the symbol "□", and a graph obtained by approximating the increase in total crystallization rate by a least square method is indicated by a straight line c1 ($Y=4.89X^2-8.39X+3.51$). The increase in total crystallization rate of Example 3 is indicated by the symbol "Δ", and a graph obtained by approximating the increase in total crystallization rate by a least square method is indicated by a straight line dl ($Y=6.40X^2-7.59X+2.28$).

As illustrated in FIG. 7, the graph of each of Examples 1 to 3 is located below the graph of Comparative Example and satisfies $Y<-5.24X+6.65$. The solid milk sample has a small increase in total crystallization rate, such that suitable solubility can be realized and strength adequate to resist breakage during handling can be sufficiently secured even in a hardening treatment in which the inner part of the solid milk is hardly affected. In particular, in a case where the graph is located above or below the curve b1 ($Y=6.34X^2-11.15X+5.05$) of Example 1, the increase in total crystallization rate can be further reduced, and more suitable solubility can be realized.

(Solubility Test of Each Sample)

In order to perform evaluation of the solubility by the hardening conditions, a solubility test was performed on the solid milk samples of Examples 1 to 3 and Comparative Example prepared as described above. First, one solid milk sample was put in a stirring basket. The stirring basket is a bottomed tubular container with a lid which has an inner diameter of 30 mm and a height of 36 mm, and has a lateral part, a bottom part, and a lid part. The lateral part, the bottom part, and the lid part are formed with a stainless steel net having 18 meshes (opening: 1.01 mm). Four blades are evenly provided in the inner face of the lateral part of the stirring basket. Each of the four blades is a plate having a thickness of 1.5 mm, a width of 4 mm, and a length of 34 mm, is disposed so that the longitudinal direction becomes parallel to the central axis of the stirring basket, and is provided to protrude from the inner face of the lateral part toward the center thereof. In a state where the stirring basket was immersed in 200 ml of warm water (50±1° C.) contained in a 300 ml beaker so that the solid milk sample was completely submerged in water, the stirring basket was rotated at a rotation speed of 0.5 m/s (peripheral speed). The stirring basket was held at a height of 5 mm from the inner face of the beaker bottom part. The dissolution process from the solid milk sample starting to dissolve until the solid milk sample completely dissolving was measured at certain time intervals on the basis of electric conductivity.

Three samples of each of Examples and Comparative Example were subjected to the test, and each of 20% dissolution time ($t_{20}$), 63% dissolution time ($t_{63}$), and 95% dissolution time ($t_{95}$) was obtained from the average value of the three samples. The 20% dissolution time, the 63% dissolution time, and the 95% dissolution time of Comparative Example were respectively designated as reference values ($t_{20ref}$, $t_{63ref}$, and $t_{95ref}$), and the solubility index ($I_d$) was calculated on the basis of the following Formula (A). The 20% dissolution time ($t_{20ref}$), the 63% dissolution time ($t_{63ref}$), and the 95% dissolution time ($t_{95ref}$) of Comparative Example were 14 (sec), 32 (sec), and 93 (sec), respectively.

$$I=(t_{20}/t_{20ref}+t_{63}/t_{63ref}+t_{95}/t_{95ref})/3 \quad (A)$$

A general dissolution test of tablets (drugs) is performed by a time until the concentration reaches 85%, or comparing a time until the concentration reaches 60% and a time until the concentration reaches 85%. However, depending on differences in the product type and the production conditions of solid milks, dissolution may stagnate at the initial stage or it may take a time to finish dissolution. Therefore, as for the solid milks, it is not appropriate that the solubility is evaluated with one or two indices as in evaluating general tablets. In particular, prolongation of the dissolution time at the initial stage is a factor with which a user feels "hardly dissolved" in the sensory evaluation, and is important in evaluation of quality of solid milks.

In the formula representing the solubility index ($I_d$) described above, the 20% dissolution time was used for evaluation of the solubility at the initial stage of dissolution, the 63% dissolution time was used for evaluation of the solubility at the middle stage of dissolution, and the 95% dissolution time was used for evaluation of the solubility at the final stage of dissolution. The 63% dissolution time indicating the solubility at the middle stage of dissolution corresponds to a time constant t in the general transient response and is widely known as a value indicating characteristics of responses in evaluation indices of response characteristics of various sensors. The 95% dissolution time indicating the solubility at the final stage of dissolution corresponds to an evaluation index indicating response characteristics in 3T with respect to the time constant τ in theory. In the formula representing the solubility index ($I_d$) described above, by determining an arithmetic average of the dissolution times at the initial stage, the middle stage, and the final stage of dissolution, the solubility index ($I_d$) is defined as a comprehensive index indicating dissolution characteristics.

It is considered that solubility in each of Examples 1 to 3 is improved because the solubility index ($I_d$) obtained in each of Examples 1 to 3 is smaller than 1, and the temperature conditions in the humidification treatment is higher than 100° C. and the treatment time is short.

(Free Fat Measurement Test)

In order to perform evaluation of the content ratio of free fat by the hardening conditions, the content ratio of free fat was measured for each solid milk sample of Example and Comparative Example prepared as described above. First, the solid milk was finely ground with a cutter with attention not to grind the solid milk down entirely. Thereafter, the ground solid milk was passed through a 32 mesh sieve. The milk obtained through the sieving step was used as a sample, and the content ratio of free fat was measured according to the method described in "Determination of Free Fat on the Surface of Milk Powder Particles", Analytical Method for Dry Milk Products, A/S NIRO ATOMIZER (1978). However, in the method for dissolving a solid milk (Niro Atomizer, 1978), the solvent for extraction was changed from carbon tetrachloride to n-hexane, and the extraction operation was changed depending on the change of the solvent. Incidentally, it is confirmed in "Investigation of measuring free fat in powdered milk", Shibata Mitsuho, Hatsumi Hama, Masami Imai, and Ikuru Toyoda, Nihon Shokuhin Kagaku Kougaku Kaishi Vol. 53, No. 10, 551 to 554 (2006) that the measurement results of the free fat do not change even if the solvent and the extraction operation are changed. It was confirmed that in all samples of Examples 1 to 3, the content ratio of free fat is lower than that of Comparative Example. The reason for this is considered that the content ratio of free fat in each of Examples 1 to 3 is reduced by a difference in hardening treatment conditions, specifically, by setting the humidification treatment temperature condition to higher than 100° C. and shortening the treatment time.

In the solid milk of the present example, the content ratio of the free fat in the same hardness region is suppressed to be lower than that in Comparative Example. This is because the generation of crystals is smaller than that in Comparative Example due to the difference in the hardening treatment conditions, specifically, the adjustment of the humidification conditions (temperature, humidity, and time). More specifically, in the solid milk of the present example, sugars become a non-crystalline rubber state by humidification, the sugars are cross-linked to each other at a contact point of particles adjacent to each other as a base point and then dried so as to be vitrified (solidified at a non-crystalline state) etc., and thus the generation of the crystals is small.

In the case of generating crystals from the non-crystalline state, since the sugars become crystals from the non-crystalline state in which particles are relatively freely moved so far, the fat and oil present in the vicinity of the surface of the crystal is crystallized (the solid suddenly appears), such that excessive shearing is applied to generate free fat at that time.

In the solid milk of the present example, since crystals are less likely to be generated, a shearing force is less likely to be applied to the fat, and as a result, the content ratio of the free fat is suppressed to be low.

Second Example

A solid milk for the example was prepared in the same manner as that of First Example. The humidification treatment temperature was set from 125° C. to 230° C., the relative humidity was set from 2% (2% RH) to 16% (16% RH), and the treatment time was set from 3 seconds to 20 seconds. The drying treatment temperature was set from over 100° C. to 330° C., and the treatment time was set from 5 seconds to 50 seconds. When an increase Yb (% by weight) in total crystallization rate is measured, the increase Yb in total crystallization rate that is a difference of a crystal ratio with respect to a total weight at a depth Xb (mm) from a surface of the obtained solid milk relative to a crystal ratio in an inner part of the solid milk satisfies the above Formula (1). Further, some solid milks satisfy the above Formula (2).

The hardness of the solid milk of Example thus prepared was ranged from 49 N to 52 N (the fracture stress at 50 N was 0.167 N/mm$^2$), all of the solid milks had strength adequate to resist breakage during handling. A solubility test was performed for the prepared solid milk against the comparative example described in First Example in the same manner as that of First Example and it was confirmed that the solubility index ($I_d$) is less than 1.00 and is lower than that of comparative example. In addition, free fat measurement test was performed for the prepared solid milk in the same manner as that of First Example and it was confirmed that in all examples the content ratio of free fat is lower than that of comparative example.

Third Example

A solid milk for the example was prepared in the same manner as that of First Example. The humidification treatment temperature was set from above 100° C. and lower than 125° C., and the other conditions (the relative humidity and the treatment time in the humidification treatment, the temperature and the treatment time in the drying treatment, and the like) were set as in Second Example. All of the prepared solid milks of Examples had hardness adequate to resist breakage during handling. When the solubility test and the free fat measurement test were performed, the solid milk of Third Example was inferior to the solid milk of Comparative Example as in Second Example. When the solid milk of Second Example and the solid milk of Third Example were compared with each other, the solid milk of Second Example was superior to the solid milk of Third Example in terms of solubility and free fat.

Example of Embodiment

Incidentally, the present disclosure may have the following configuration. When the present disclosure has the following configuration, a solid food and a solid milk can have suitable solubility and strength adequate to resist breakage during handling.

(1) A solid food having a solid form obtained by compression molding a food powder, in which an increase Ya (% by weight) in total crystallization rate satisfies that is a difference of a crystal ratio with respect to a total weight at a depth Xa (mm) from a surface of the solid food relative to a crystal ratio in an inner part of the solid food satisfies the following Formula (1A), $$Ya<-5.24Xa+6.65 \quad (1A).$$

(2) The solid food according to (1), in which the increase Ya (% by weight) in total crystallization rate at the depth Xa (mm) from the surface of the solid food satisfies the following Formula (2A), $$Ya\leq 6.34Xa^2-11.15Xa+5.05 \quad (2A).$$

(3) A solid milk having a solid form obtained by compression molding a powdered milk, in which an increase Yb (% by weight) in total crystallization rate that is a difference of a crystal ratio with respect to a total weight at a depth Xb (mm) from a surface of the solid milk relative to a crystal ratio in an inner part of the solid milk satisfies the following Formula (1), $$Yb<-5.24Xb+6.65 \quad (1)$$

(4) The solid milk according to (3), in which the increase Yb (% by weight) in total crystallization rate at the depth Xb (mm) from the surface of the solid milk satisfies the following Formula (2), $$Yb\leq 6.34Xb^2-11.15Xb+5.05 \quad (2).$$

(5) A solid food having a solid form obtained by compression molding a food powder, in which the solid food is formed by performing a hardening treatment on a compression molded body of the food powder obtained by compression molding the food powder so that an increase Ya (% by weight) in total crystallization rate that is a difference of a crystal ratio with respect to a total weight at a depth Xa (mm) from a surface of the solid food relative to a crystal ratio in an inner part of the solid food satisfies the following Formula (1A), $$Ya<-5.24Xa+6.65 \quad (1A)$$

(6) A solid milk having a solid form obtained by compression molding a powdered milk, in which the solid milk is formed by performing a hardening treatment on a compression molded body of the powdered milk obtained by compression molding the powdered milk so that an increase Yb (% by weight) in total crystallization rate that is a difference of a crystal ratio with respect to a total weight at a depth Xb (mm) from a surface of the solid milk relative to a crystal ratio in an inner part of the solid milk satisfies the following Formula (1), $$Yb<-5.24Xb+6.65 \quad (1)$$

(7) A solid food having a solid form obtained by compression molding a food powder, in which a fracture stress of the solid food is 0.067 N/mm$^2$ or more and 0.739 N/mm$^2$ or less, and an increase Ya (% by weight) in total crystallization rate that is a difference of a crystal ratio with respect to a total weight at a depth Xa (mm) from a surface of the solid food relative to a crystal ratio in an inner part of the solid food satisfies the following Formula (1A), $$Ya<-5.24Xa+6.65 \quad (1A)$$

(8) A solid milk having a solid form obtained by compression molding a powdered milk, in which a fracture stress of the solid milk is 0.067 N/mm$^2$ or more and 0.739 N/mm$^2$ or less, and an increase Yb (% by weight) in total crystallization rate that is a difference of a crystal ratio with respect to a total weight at a depth Xb (mm) from a surface of the solid milk relative to a crystal ratio in an inner part of the solid milk satisfies the following Formula (1), $$Yb<-5.24Xb+6.65 \quad (1)$$

(9) A solid dissolvable food having a solid form obtained by compression molding a food powder, in which an increase Ya (% by weight) in total crystallization rate that is a difference of a crystal ratio with respect to a total weight at a depth Xa (mm) from a surface of the solid dissolvable food relative to a crystal ratio in an inner part of the solid dissolvable food satisfies the following Formula (1A), $$Ya<-5.24Xa+6.65 \quad (1A)$$

(10) A solid food having a solid form obtained by compression molding a food powder, in which an increase Ya (% by weight) in total crystallization rate that is a difference of a crystal ratio with respect to a total weight at a depth Xa (mm) from a surface of the solid food relative to a crystal ratio in an inner part of the solid food satisfies the following Formula (1A), and tackiness is generated by a hardening treatment, $$Ya<-5.24Xa+6.65 \quad (1A)$$

REFERENCE SIGNS LIST

10 Body
10A First face
10B Second face
10C Lateral face
10S Solid milk

The invention claimed is:

1. A solid milk having a solid form obtained by compression molding a powdered milk and performing a hardening treatment, wherein an increase Yb (% by weight) in total crystallization rate that is a difference of a crystal ratio with respect to a total weight at a depth Xb (mm) from a surface of the solid milk relative to a crystal ratio in an inner part of the solid milk is 3.1% by weight or less when Xb (mm) is 0.2 mm or more and less than 0.3 mm, 2.3% by weight or less when Xb (mm) is 0.3 mm or more and less than 0.4 mm, and 1.0% by weight or less when Xb (mm) is 0.7 mm or more and less than 0.8 mm, wherein a surface layer of the solid milk is a harder layer than the inner part, wherein the surface layer includes the surface.

2. The solid milk according to claim 1, wherein the increase Yb (% by weight) in total crystallization rate is 5.05% by weight or less when Xb (mm) is 0 mm.

* * * * *